United States Patent
Sato et al.

(10) Patent No.: US 7,320,087 B2
(45) Date of Patent: Jan. 15, 2008

(54) INFORMATION PROCESSING APPARATUS AND METHOD, PROGRAM, AND RECORDING MEDIUM

(75) Inventors: Masahiko Sato, Tokyo (JP); Kazuhiro Watanabe, Tokyo (JP); Kozo Obayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 10/808,934

(22) Filed: Mar. 25, 2004

(65) Prior Publication Data
US 2004/0250167 A1    Dec. 9, 2004

(30) Foreign Application Priority Data
Mar. 27, 2003 (JP) .............................. 2003-087783

(51) Int. Cl.
*G06F 11/00* (2006.01)
(52) U.S. Cl. ..................... 714/6; 714/807; 717/173; 717/178
(58) Field of Classification Search ...................... None
See application file for complete search history.

(56) References Cited

U.S. PATENT DOCUMENTS

| | | | |
|---|---|---|---|
| 6,357,021 B1* | 3/2002 | Kitagawa et al. | 714/41 |
| 6,584,559 B1* | 6/2003 | Huh et al. | 713/2 |
| 6,675,201 B1* | 1/2004 | Parkkinen | 709/216 |
| 6,907,602 B2* | 6/2005 | Tsai et al. | 717/168 |
| 7,051,211 B1* | 5/2006 | Matyas et al. | 713/187 |
| 2001/0011347 A1* | 8/2001 | Narayanaswamy et al. | 713/2 |
| 2002/0095619 A1* | 7/2002 | Marsh | 714/23 |

OTHER PUBLICATIONS

Patent Abstract of Japan: 09-016404, Jan. 17, 1997 (Full Translation).
Patent Abstract of Japan: 09-044410, Feb. 14, 1997 (Full Translation).

* cited by examiner

*Primary Examiner*—Marc Duncan
(74) *Attorney, Agent, or Firm*—Frommer Lawrence & Haug LLP; William S. Frommer

(57) ABSTRACT

The present invention is intended to download software more securely to update the functions of software. When files are downloaded from a server into an information processing apparatus, a CPU downloads the files into bank A or bank B of a storage unit and copies the files into bank C. The CPU calculates a checksum of each file and a total checksum of all files and stores the obtained checksums into a memory. The checksums stored in the memory are compared with those of the server. Any file that has an error is downloaded again. In addition, at the end of the operation of the information processing apparatus, a normal end flag is stored in the memory. If, at the next startup of the information processing apparatus, its last operation is found to have been abnormally ended, the apparatus is started up by use of bank C. The present invention is applicable to personal computers.

11 Claims, 12 Drawing Sheets

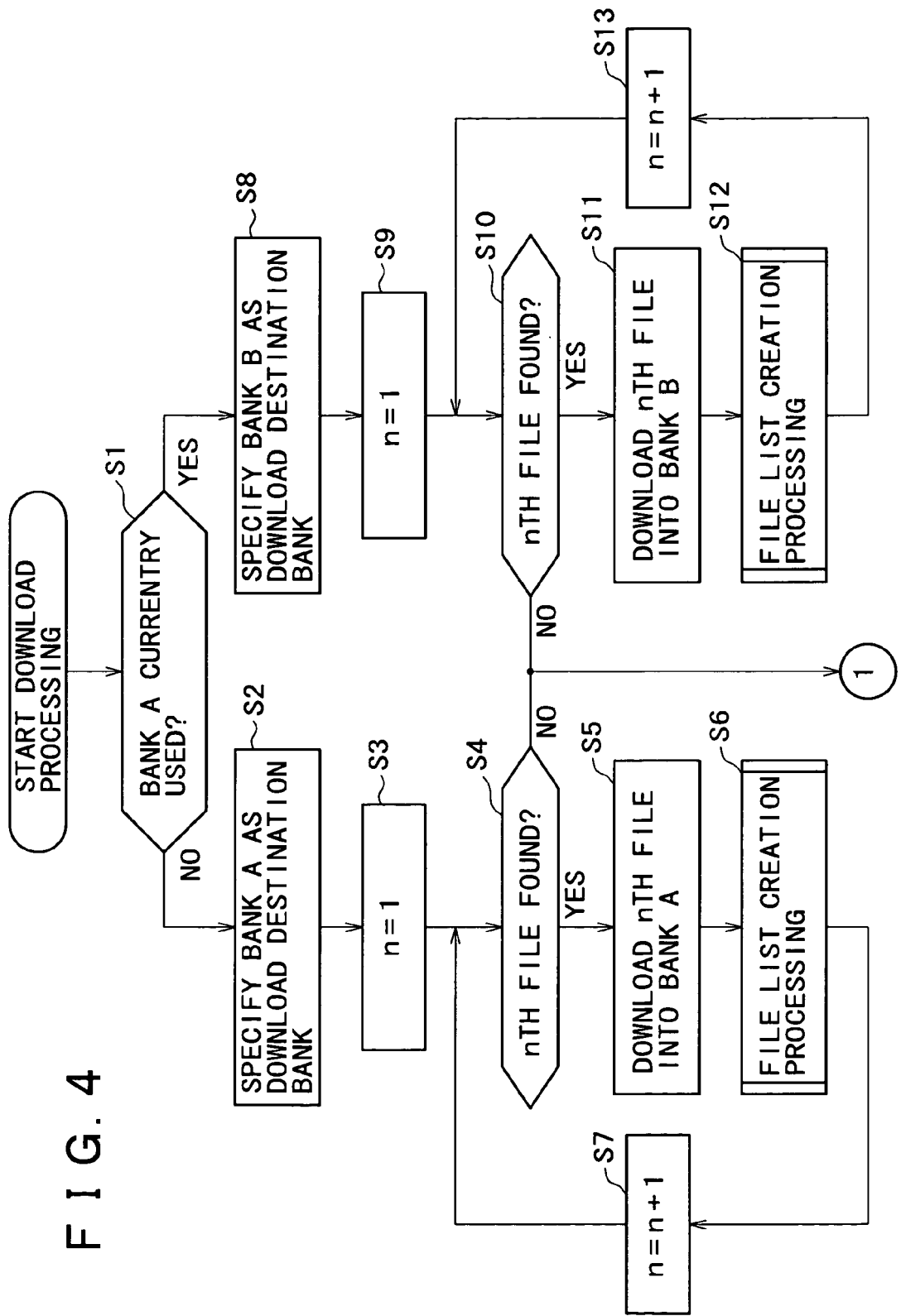
F I G. 4

F I G. 7
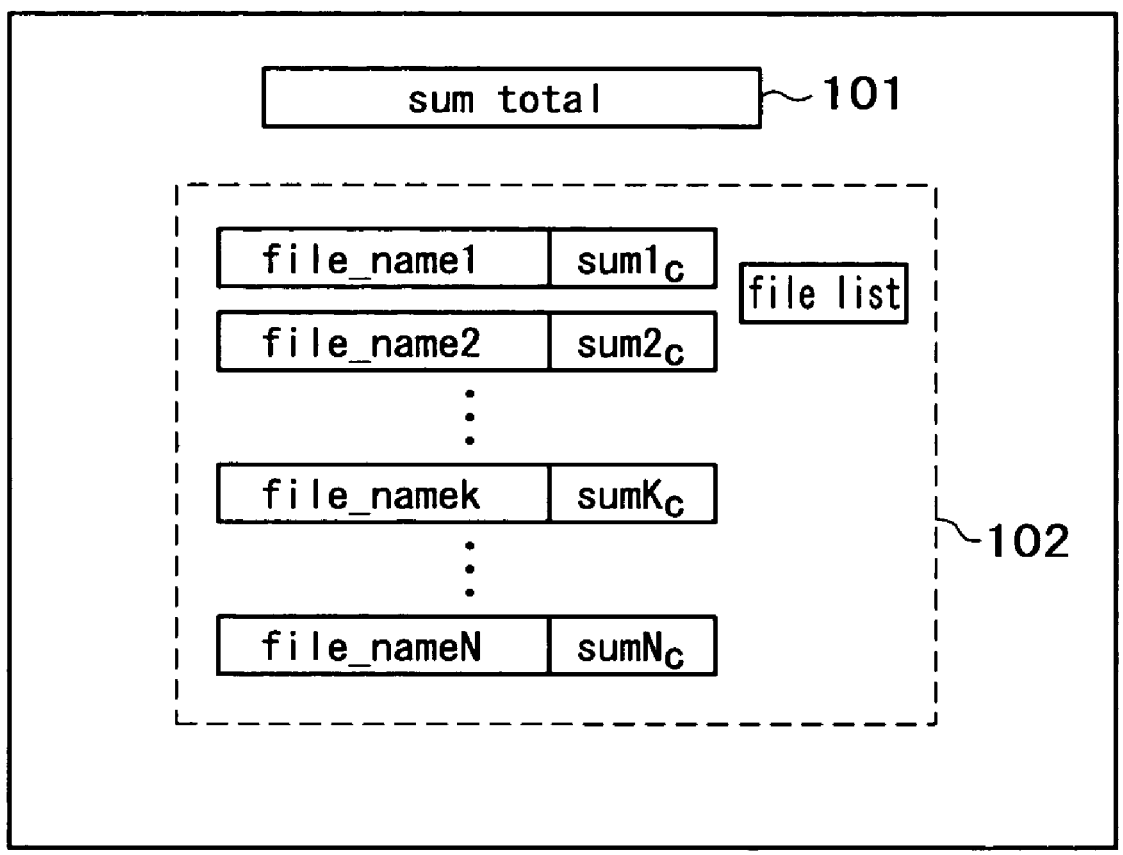

US 7,320,087 B2

INFORMATION PROCESSING APPARATUS AND METHOD, PROGRAM, AND RECORDING MEDIUM

BACKGROUND OF THE INVENTION

The present invention relates generally to an information processing apparatus and method, a program, and a recording medium and, more particularly, to an information processing apparatus and method, a program, and a recording medium which securely download software to update software affected by an abnormal end for example of the information processing apparatus.

When an abnormal end occurs on information processing apparatuses such as personal computers, they must be restarted by use of the backup data which were saved in advance; however, this operation possibly involves a discrepancy between the downloaded software for use in updating the software of abnormally ended information processing apparatuses and their backup data. In order to solve this problem, technologies have been developed in which, at the downloading of software, the storage area which was active when an abnormal end took place is switched to the other storage area in the information processing apparatus and, after the downloading, it is started up by use of this other storage area. Technologies have also been proposed in which the software to be downloaded is divided into a plurality of blocks and checksum calculation is executed only on the sending side to reduce software download time (for example, patent document 2: Japanese Patent Laid-open No. Hei 09-16404).

However, these related-art technologies do not consider the case in which an abnormal end occurred on information processing apparatuses while the software is being downloaded. Also, these related-art technologies do not provide a method of quickly and correctly checking to see whether the software downloading has normally ended.

SUMMARY OF THE INVENTION

It is therefore an object of the present invention to provide an information processing apparatus and method, a program, and a recording medium which are capable of more safely downloading software than conventionally practiced, thereby updating functions of each information processing apparatus of which operation has abnormally ended.

According to an aspect of the present invention, an information processing apparatus for downloading software into one of a first storage area and a second storage area includes selecting means for selecting one of the first storage area and the second storage area into which the software is to be downloaded, first calculating means for calculating a first calculation value indicative of an error of the software, second calculating means for calculating a second calculation value indicative of an error on the basis of the first calculation value, and determining means for determining whether the information processing apparatus has normally ended.

The information processing apparatus may further include a third storage area. Preferably, the first calculating means copies the downloaded software into the third storage area.

The software may be downloaded in a predetermined unit of files. Preferably, the first calculating means calculates an error for each of the files as the first calculation value, and the second calculating means calculates a calculation value indicative of an error on the basis of predetermined number of the first calculation values as the second calculation value.

The determining means may include verifying means for verifying whether the shutdown of the information processing apparatus has ended, and setting means for setting predetermined information indicative of normal end of the shutdown of the information processing apparatus.

The information processing apparatus may further include first comparing means for comparing a second calculation value of the information processing apparatus with a second calculation value of one of a server and a removable medium, and second comparing means for comparing a first calculation value of the information processing apparatus with a first calculation value of one of the server and the removable medium if, as a result of the comparison by the first comparing means, there is a mismatch between the second calculation value of the information processing apparatus and the second calculation value of one of the server and the removable medium.

If there is a mismatch between the first calculation value of the information processing apparatus and the first calculation value of one of the server and the removable medium, the second comparing means may download a file corresponding to the first calculation value.

The information processing apparatus may further include startup means for starting up the information processing apparatus by selecting one of the storage areas on the basis of the predetermined information set by the setting means.

The startup means may have setting information determining means for determining the information set by the setting means which starts up the information processing apparatus by use of the software stored in one of the first storage area and the second storage area, if the predetermined information indicative of normal end of the shutdown of the information processing apparatus is found set by the setting information determining means, and starts up the information processing apparatus by use of the software stored in the third storage area, if the predetermined information indicative of normal end of the shutdown of the information processing apparatus is found not set by the setting information determining means.

According to another aspect of the present invention, an information processing method for an information processing apparatus for downloading software into one of a first storage area and a second storage area, includes the steps of selecting one of the first storage area and the second storage area into which the software is to be downloaded, calculating a first calculation value indicative of an error of the software, calculating a second calculation value indicative of an error on the basis of the first calculation value, and determining whether the information processing apparatus has normally ended.

According to further aspect of the present invention, there is provided a program for an information processing apparatus which downloads software into one of a first storage area and a second storage area. The program may cause a computer to execute the steps of selecting one of the first storage area and the second storage area into which the software is to be downloaded, calculating a first calculation value indicative of an error of the software, calculating a second calculation value indicative of an error on the basis of the first calculation value, and determining whether the information processing apparatus has normally ended.

According to further aspect of the present invention, there is provided a recording medium storing a program for an information processing apparatus which downloads software into one of a first storage area and a second storage area. The program may cause a computer to execute the steps of selecting one of the first storage area and the second storage area into which the software is to be downloaded, calculating a first calculation value indicative of an error of the software, calculating a second calculation value indicative of an error on the basis of the first calculation value, and determining whether the information processing apparatus has normally ended.

BRIEF DESCRIPTION OF THE DRAWINGS

These and other objects of the invention will be seen by reference to the description, taken in connection with the accompanying drawing, in which:

FIG. 4 is a flowchart for describing download processing;

FIG. 7 is a diagram illustrating an example of information stored in a memory shown in FIG. 1;

DETAILED DESCRIPTION OF PREFERRED EMBODIMENTS

Figure 1:
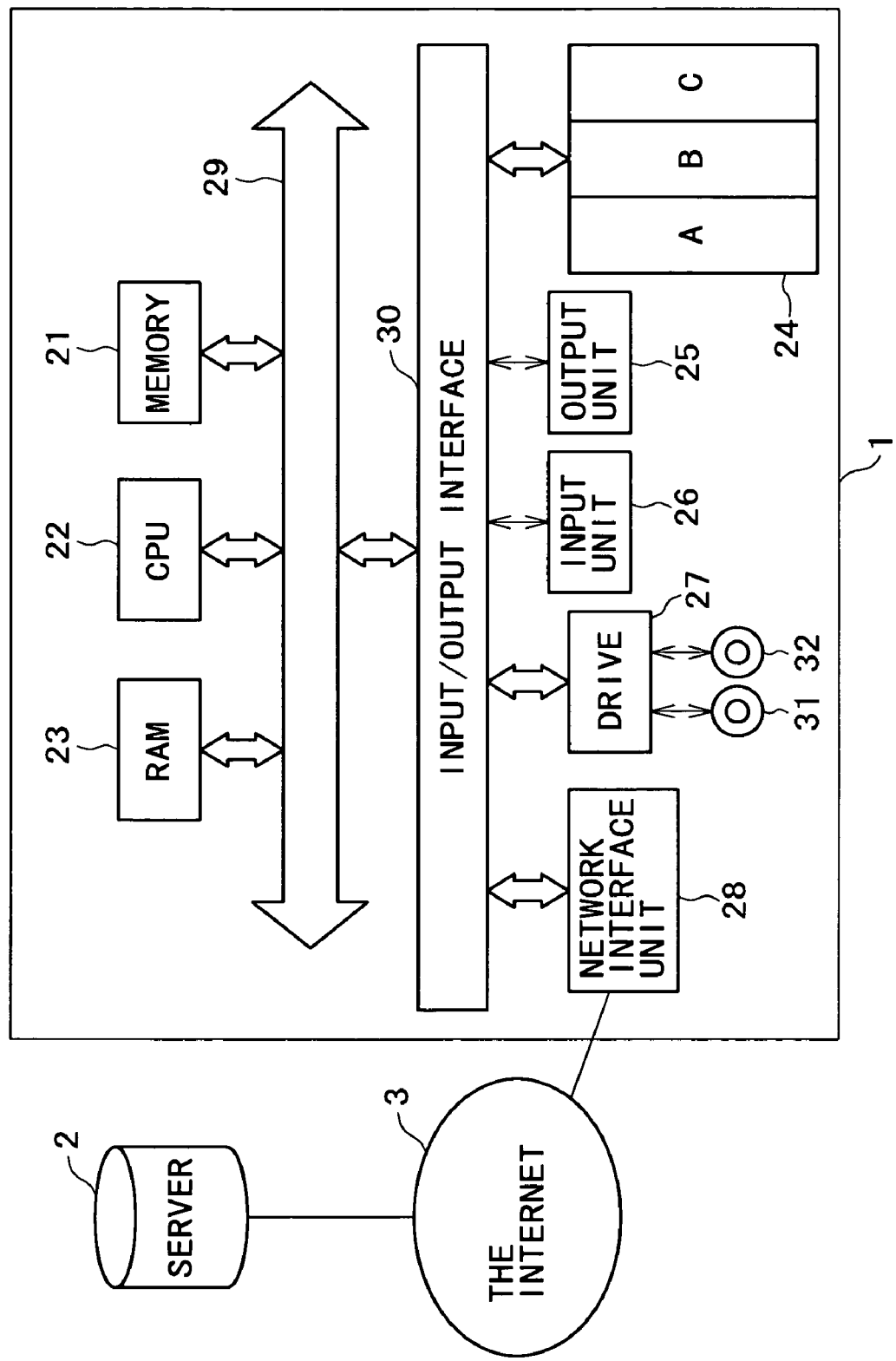
FIG. 1 is a block diagram illustrating an exemplary configuration of an information processing apparatus practiced as one embodiment of the invention.

This invention will be described in further detail by way of example with reference to the accompanying drawings. Now, referring to FIG. 1, there is shown a block diagram of an exemplary configuration of an information processing apparatus practiced as one embodiment of the invention. In this exemplary configuration, an information processing apparatus 1 is connected to the Internet 3. A server 2 is also connected to the Internet 3.

For example, the information processing apparatus 1 which is configured by a personal computer has a network interface unit 28 which accesses the server 2 via the Internet 3 to download software. A CPU 22 performs a checksum operation on the downloaded software and stores its result into a memory 21. The memory 21 is configured by an EEPROM (Electrically Erasable and Programmable Read Only Memory) for example.

The downloaded software is stored in a storage unit 24. The storage unit 24 is configured by a HDD (Hard Disk Drive) but not exclusively; another storage unit (for example, a flash memory) may also be used. The HDD is divided into three storage areas (banks) A, B, and C, which individually store the programs and parameters for example necessary for starting up the information processing apparatus 1. When starting up the information processing apparatus 1, one of bank A and bank B are usually chosen by the CPU 22 to startup the information processing apparatus 1 on the basis of the program and parameter stored in the chosen bank.

The CPU 22 executes various processing operations in accordance with programs loaded from the storage unit 24 into a RAM 23. The RAM 23 also stores, from time to time, data necessary for the CPU 22 to execute various processing operations.

The memory 21, the CPU 22, and the RAM 23 are interconnected via a bus 29. The bus 29 is also connected to an input/output interface 30.

The input/output interface 30 is connected to an input unit 26 and an output unit 25 like the above-mentioned storage unit 24 and the network interface unit 28. The input unit 26 is configured by a keyboard and a mouse for example. The output unit 25 is configured by a display unit based on CRT (Cathode Ray Tube) or LCD (Liquid Crystal Display) and a speaker, for example.

The input/output interface 30 is also connected to a drive 27 as required. On the drive 27, a recording medium such as an optical disk 31 or a magneto-optical disk 32 is loaded. Computer programs read from the loaded recording medium are installed in the storage unit 24 as required.

For example, in the case where the software necessary for updating the OS (Operating System) of the information processing apparatus 1 is downloaded from the server 2, if the information processing apparatus 1 is currently operating in accordance with programs and parameters stored in bank A of the storage unit 24, the software is downloaded into bank B. When the information processing apparatus 1 is restarted, bank B is selected by the CPU 22, upon which the information processing apparatus 1 starts operating in accordance with programs and parameters stored in bank B of the storage unit 24.

Figure 2:
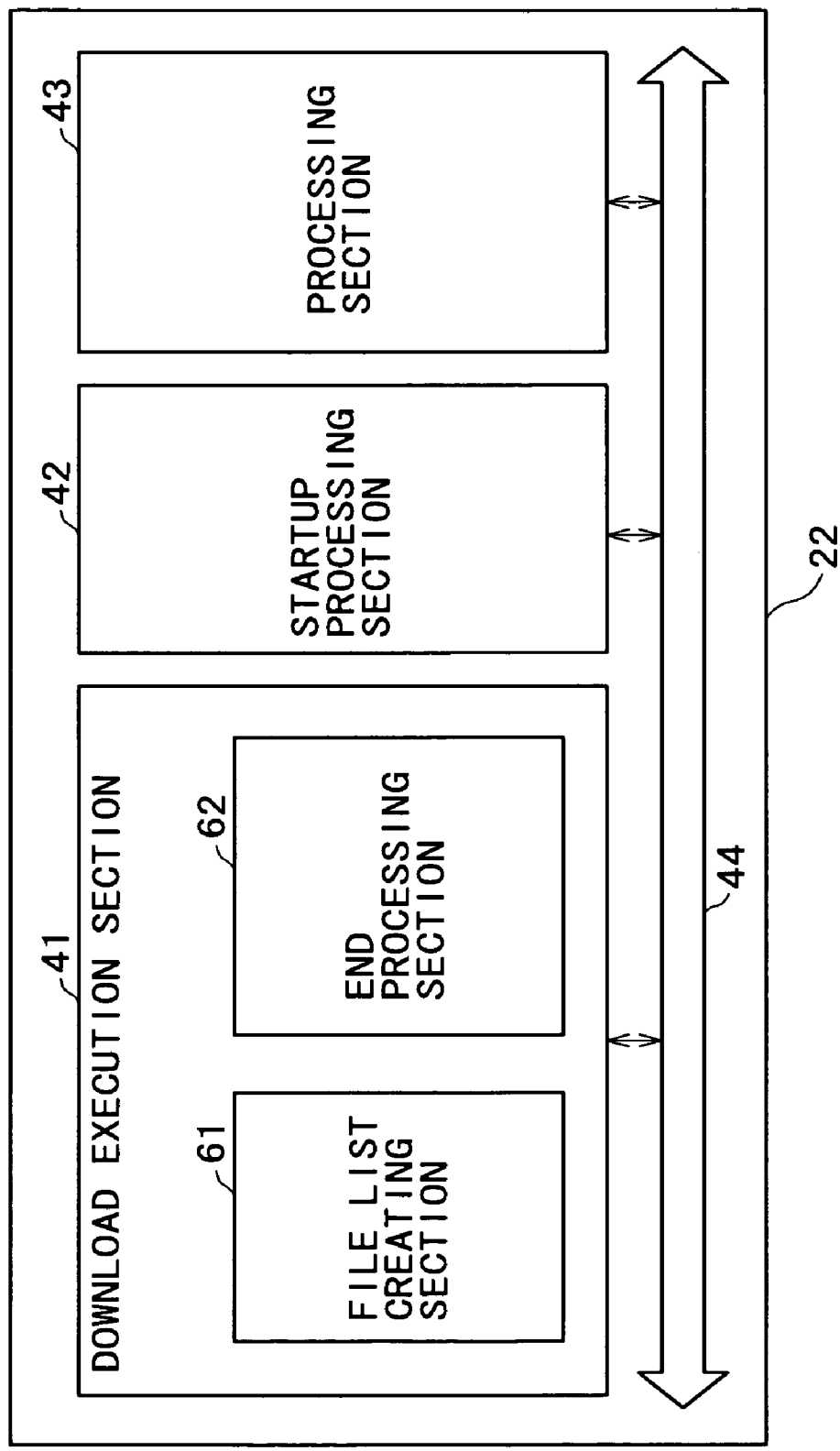
FIG. 2 is a schematic diagram illustrating an exemplary functional configuration of a CPU shown in FIG. 1.

Referring to FIG. 2, there is shown a block diagram illustrating a functional configuration of the CPU 22 of FIG. 1. In this example, a download execution section 41 for executing software download processing, a startup processing section 42 for executing the startup processing of the information processing apparatus 1, and a processing section 43 for executing other processing operations are interconnected via a bus 44.

The download execution section 41 has a file list creating section 61 for executing a checksum operation on each downloaded software file to create a file list and an end processing section 62 for executing end processing of the information processing apparatus 1.

Figure 3:
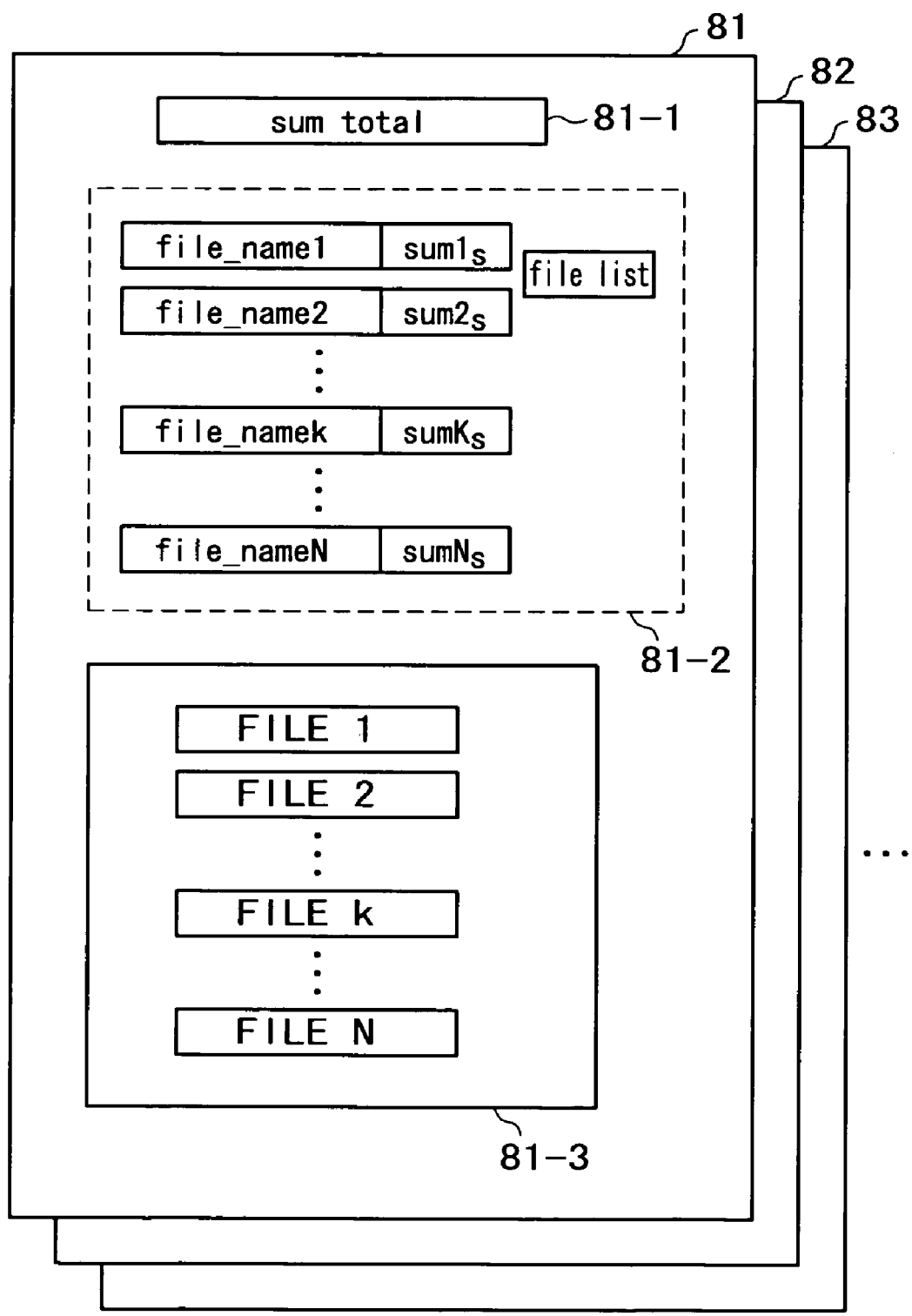
FIG. 3 is a schematic diagram illustrating an exemplary configuration of data stored in a server.

Referring to FIG. 3, there is shown an exemplary configuration of the software stored in the server 2. In this example, data 81 are configured by a file block 81-3 containing N files each configured by programs and parameters necessary for updating the OS of the information processing apparatus 1, a file list 81-2 configured by the file names of the files stored in the file block 81-3 and their checksums, and a sum total 81-1 calculated by use of the checksums in the file list 81-2.

The file list 81-2 contains file name file_name1 for file 1 in the file block 81-3 and checksum sum1s for file 1. Likewise, the file list 81-2 contains file names file_name 2, . . . , file_nameK, . . . file_nameN for file 2, . . . file K, . . . , and file N and their checksums sum2s, . . . , sum Ks, . . . , and sumNs.

The data are created on an OS version basis for example. Data 81, data 82 which are one generation before data 81, and data 83 which are one generation before data 82, for example, are stored in the server 2.

Figure 5:
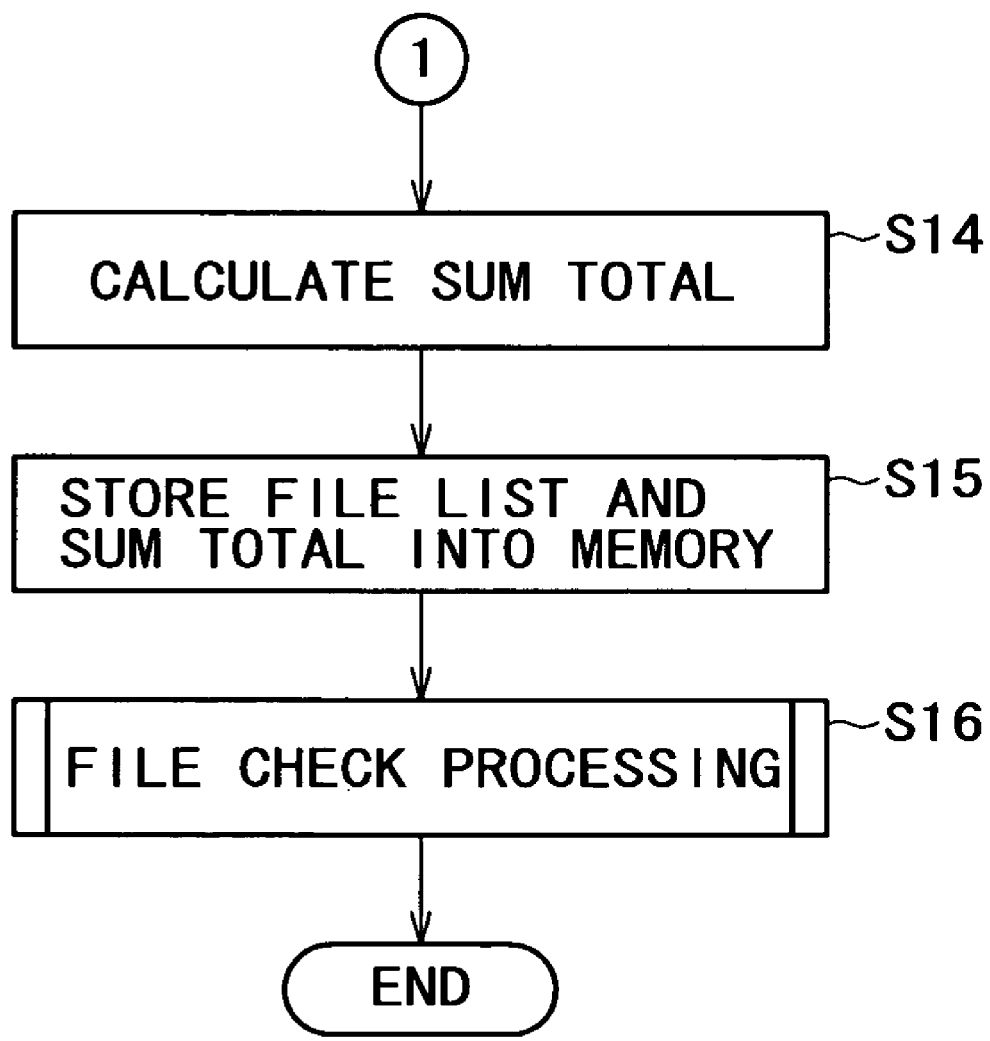
FIG. 5 is a flowchart continued from the flowchart shown in FIG. 4.

The following describes downloading processing with reference to FIGS. 4 and 5. This processing is executed when the user issues an instruction of downloading the data for updating the OS by operating the keyboard of the input unit 26 of the information processing apparatus 1, for example.

In step S1, the download execution section 41 determines whether the bank in the storage unit 24 in current use is bank A. If the current bank is found not to be bank A, namely, the bank in current use is bank B, then the procedure goes to step S2, in which the download execution section 41 specifies bank A as the bank into which the data are to be downloaded. In step S3, the download execution section 41 sets value 1 to variable n. In step S4, the download execution section 41 determines whether there is the nth file. If the nth file is found, the download execution section 41 download the nth file into bank A.

In step S6, the file list creating section 61 of the download execution section 41 executes the file list creation processing to be described later with reference to FIG. 6. Consequently, a file list to be described later with reference to FIG. 7 is created.

In step S7, the download execution section 41 increment the n value by 1 and then returns to step S4 to repeat the above-mentioned processing therefrom. Consequently, file 1, file 2, . . . , file K, . . . , and file N in the file block 81-3 shown in FIG. 3 are sequentially stored in bank A of the information processing apparatus 1 from the server 2.

On the other hand, if the bank in current use is found to be bank A in step S1, then the download execution section 41 specifies bank B as the download destination bank in step S8 and executes, in steps S9 through S13, the same processing as that of steps S4 through S7. Consequently, file 1, file 2, . . . , file K, . . . , and file N in the file block 81-3 shown in FIG. 3 are sequentially stored in bank B of the information processing apparatus 1.

If there is found no nth file in step S4 or step S10, namely, if file 1, file 2, . . . , file K, . . . , and file N in the file block 81-3 shown in FIG. 3 have all been downloaded, then the download execution section 41 calculates a sum total in step S14.

A sum total is indicative of a checksum of the entire (or total) data calculated on the basis of checksum sum1$c$ of file 1, checksum sum2$c$ of file 2, checksum sumK$c$ of file K, . . . , and checksum sumN$c$ of file N.

In step S15, the download execution section 41 stores, in the memory 21, the file list created by the processing of step S6 or step S12 and the sum total obtained by the processing of step S15.

In step S16, the download execution section 41 executes the file check processing to be described later with reference to FIG. 8. Consequently, the checksum of the server 2 are compared with the checksum of the memory 21 of the information processing apparatus 1 to see if all files have been downloaded without error.

Thus, N files 81-3 of the data 81 have been downloaded from the server 2 and the file list corresponding to the downloaded files and a sum total 101 (as shown in FIG. 7 to be described later) are created.

Figure 6:
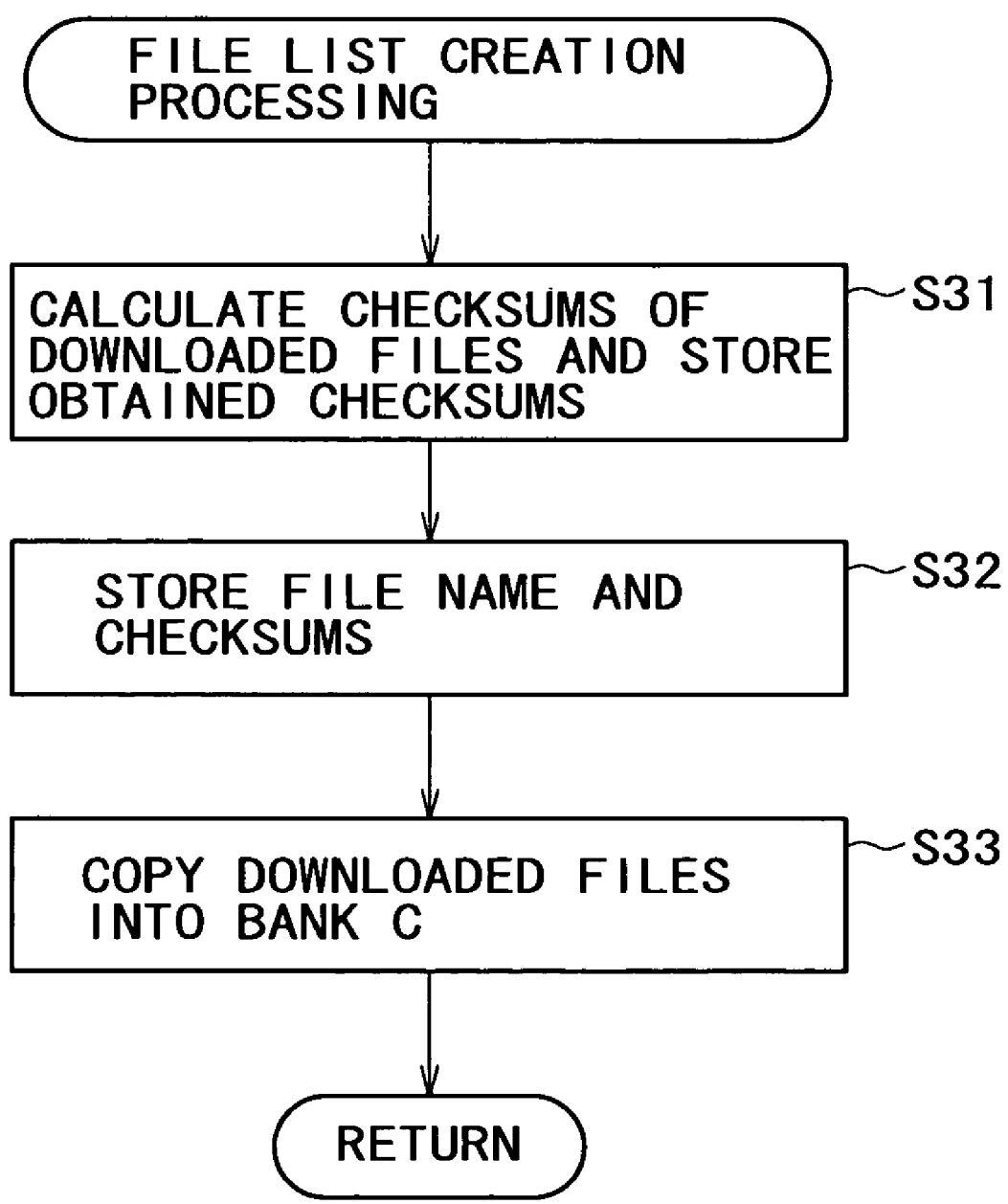
FIG. 6 is a flowchart for describing a file list creation processing.

The following describes, with reference to FIG. 6, the file list creation processing in step S6 or step S12 shown in FIG. 4.

In step S31, the file list creating section 61 calculates the checksum of the downloaded file and stores a temporary storage unit, not shown, in the file list creating section 61. At this moment, MD5 is used for the calculation of checksums.

In step S32, the file list creating section 61 stores the checksum obtained in step S31 as related with its file name.

In step S33, the file list creating section 61 copies the downloaded file to bank C. By doing so, if the data stored in the bank into which a file has been downloaded (bank A or bank B) cannot be normally read because of an abnormal end of the information processing apparatus 1 due to power failure for example after the downloading of the file, the information processing apparatus 1 can be started up by use of bank C.

Thus, the file name of the downloaded file and its checksum are stored for the creation of a file list. As a result, when N files have been downloaded, the memory 21 of the information processing apparatus 1 stores the information as shown in FIG. 7.

In the above-mentioned example, checksum calculation processing is executed to create a file list when the information processing apparatus 1 downloads the software from the server 2. Alternatively, the checksum calculation may be executed when the information processing apparatus 1 is started up or ended. Still alternatively, the checksum calculation may be executed in a time zone when the load of the CPU 22 of the information processing apparatus 1 is low. Yet alternatively, the checksum calculation may be executed at certain time intervals.

A file list 102 shown in FIG. 7 is a file list which corresponds to N files downloaded from the server 2, file_name1 being written as the file name of file downloaded file 1 and sum1$c$ being written as its checksum. Likewise, file_name2, . . . , file_nameK, . . . , file_nameN are written as the file names of file 2, . . . , file K, and file N respectively and sum2$c$, . . . , sumK$c$, . . . , and sumN$c$ are written as their checksums respectively. As described above, on the basis of sum1$c$ through sumN$c$, a sum total is calculated in step S14 shown in FIG. 5, a sum total value 101 being stored in the memory 21 along with the file list 102 in step S15.

Figure 8:
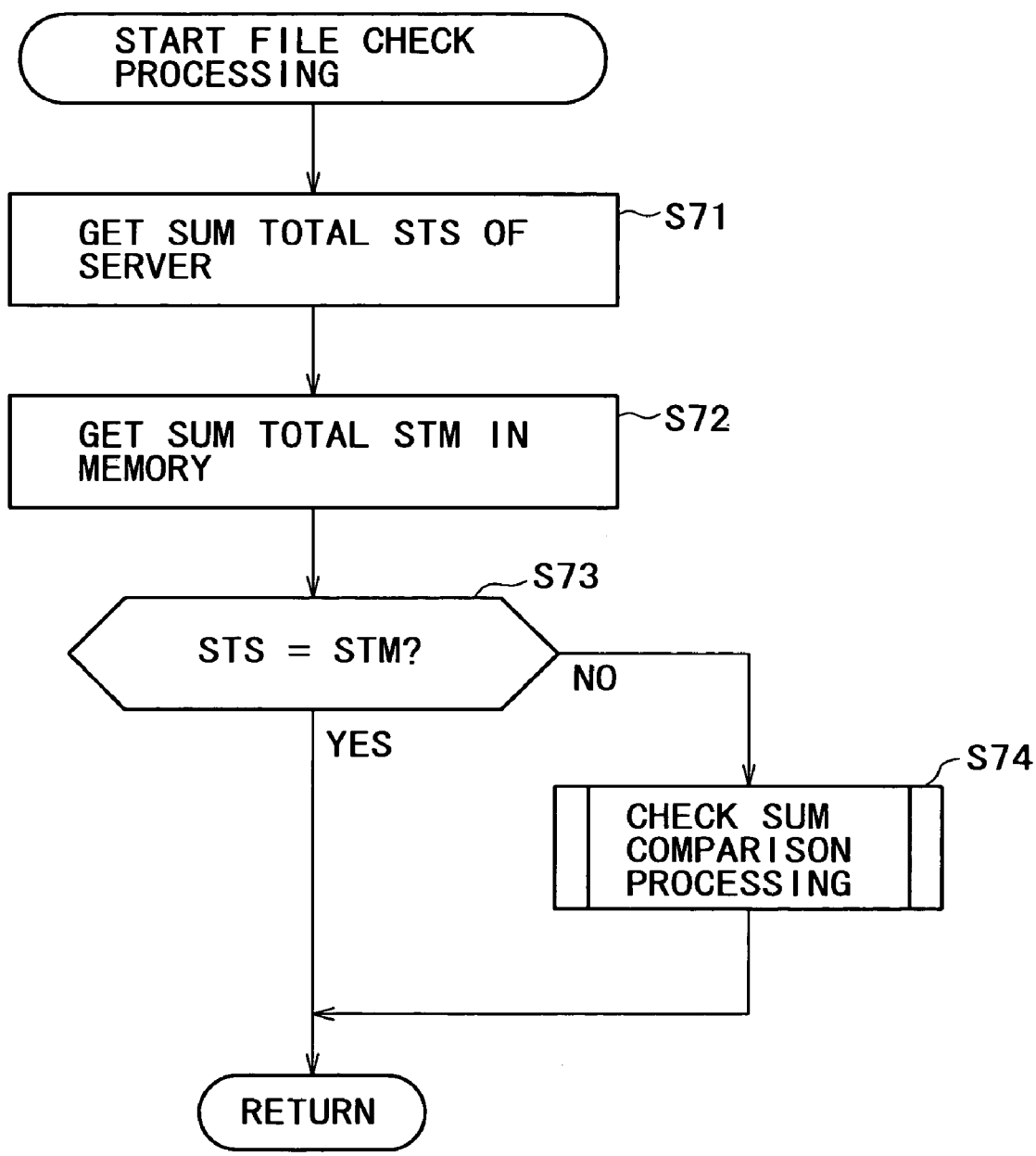
FIG. 8 is a flowchart for describing file check processing.

The following describes the file check processing of step S16 shown in FIG. 5 with reference to FIG. 8. In step S71, the download execution section 41 gets the sum total 81-1 (FIG. 3) of the server 2 as value STS and the a sum total 101 (FIG. 7) in the memory 21 as value STM in step S72. In step S73, the download execution section 41 determines whether value STM is equal to value STS.

The sum total 81-1 of the server 2 is a checksum calculated on the basis of the checksums sum1$s$ through sumN$s$ written in the file list 81-2 of the server 2 and the sum total 101 of the memory 21 is a checksum calculated on the basis of the checksums sum1$c$ through sumN$c$ written in the file list 102 of the memory 21. If a match is found between these sum totals, it indicates that the values of checksums sum1$s$ through sumN$s$ and the values of checksums sum1$c$ through sumN$c$ match each other. Namely, it indicates that N files have all been downloaded without error.

If value STM is found equal to value STS in step S73, then the download execution section 41 determines that all files have been downloaded without error, thereby ending the file check processing. Thus, error checking can be made on all downloaded files without making comparison between the checksums of all files, thereby quickly ending the file check processing.

On the other hand, if value STM is found not equal to value STS in step S73, then the download execution section 41 goes to step S74 to execute checksum comparison processing to be described with reference to FIG. 9. Consequently, the checksums of the files are compared with each other, thereby downloading again those files which have been downloaded erroneously.

Figure 9:
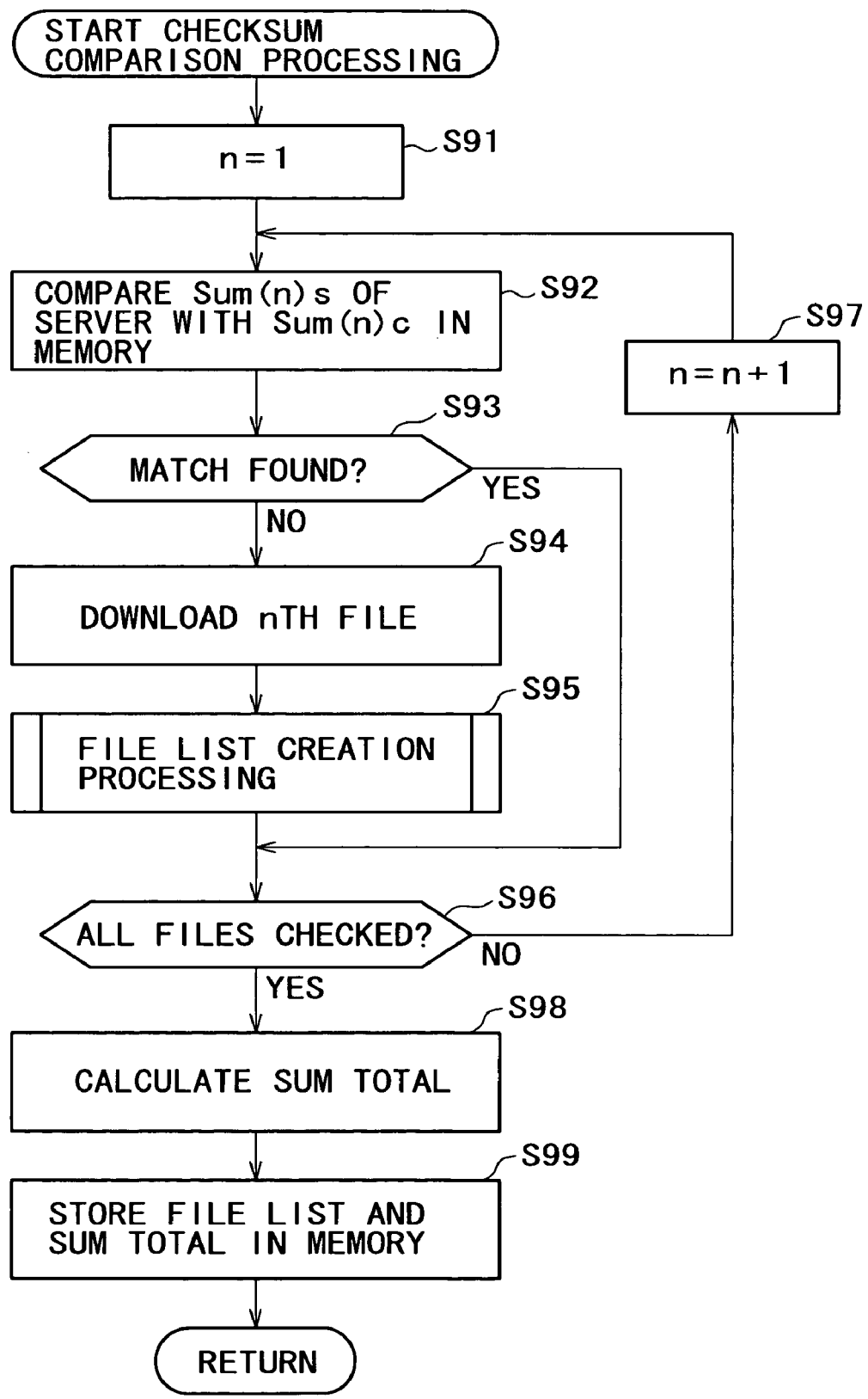
FIG. 9 is a flowchart for describing checksum comparison processing.

The following describes, with reference to FIG. 9, the checksum comparison processing of step S74 shown in FIG. 8.

In step S91, the download execution section 41 sets value n to 1. In step S92, the download execution section 41 compares checksum sum(n)$s$ written to the file list 81-2 of the server 2 with checksum sum(n)$c$ written to the file list 102 of the memory 21. When n is 1, checksum sum1s of the file list 81-2 is compared with checksum sum1c of the file list 102. In step S93, the download execution section 41 determines whether there is a match between them. If a match is found, the download execution section 41 goes to step S96 to determine whether all files have been checked. If there is any files left unchecked, the download execution section 41 goes to step S97 to increment value of n by 1, upon which the download execution section 41 returns to step S92. Thus, whether or not there is match between checksums sum1s and sum1c, sum2s and sum2c, and so on can be confirmed.

If a mismatch is found between sum(n)s and sum(n)c in step S93, then the download execution section 41 goes to step S94 to download the nth file. For example, if a mismatch is found between the value of checksum sumKs and the value of sumKc in step S93, it is possible that there is an error in the contents of downloaded file K. Therefore, file K is downloaded again from the server 2 into the information processing apparatus 1 in step S94.

In step S95, the download execution section 41 causes the file list creating section 61 to execute file list creation processing. The file list creation processing of step S95 is the same as that described with reference to FIG. 6, so that its detail description will be skipped. By this processing, checksum sumKc of file K is calculated again.

In step S96, the download execution section 41 determines whether all files have been checked. If the decision is no, the download execution section 41 goes to step S97 to increment value n by 1 and returns to step S92, thereby repeating the above-mentioned processing therefrom.

If all files are found to have been checked in step S96 (namely, if value n=N), the download execution section 41 calculates a sum total in step S98 and stores the file list and the sum total into the memory 21 in step S99. In this example, sumKc of the file list 102 in the memory 21 is newly calculated and the value of the sum total 101 is newly calculated accordingly, thereby updating the information stored in the memory 21.

In the above-mentioned example, the case in which files are downloaded from the server 2 to the information processing apparatus 1 is used, but not exclusively. For example, it is also practicable to download files from a recording medium loaded on the drive 27 of the information processing apparatus 1.

Figure 10:
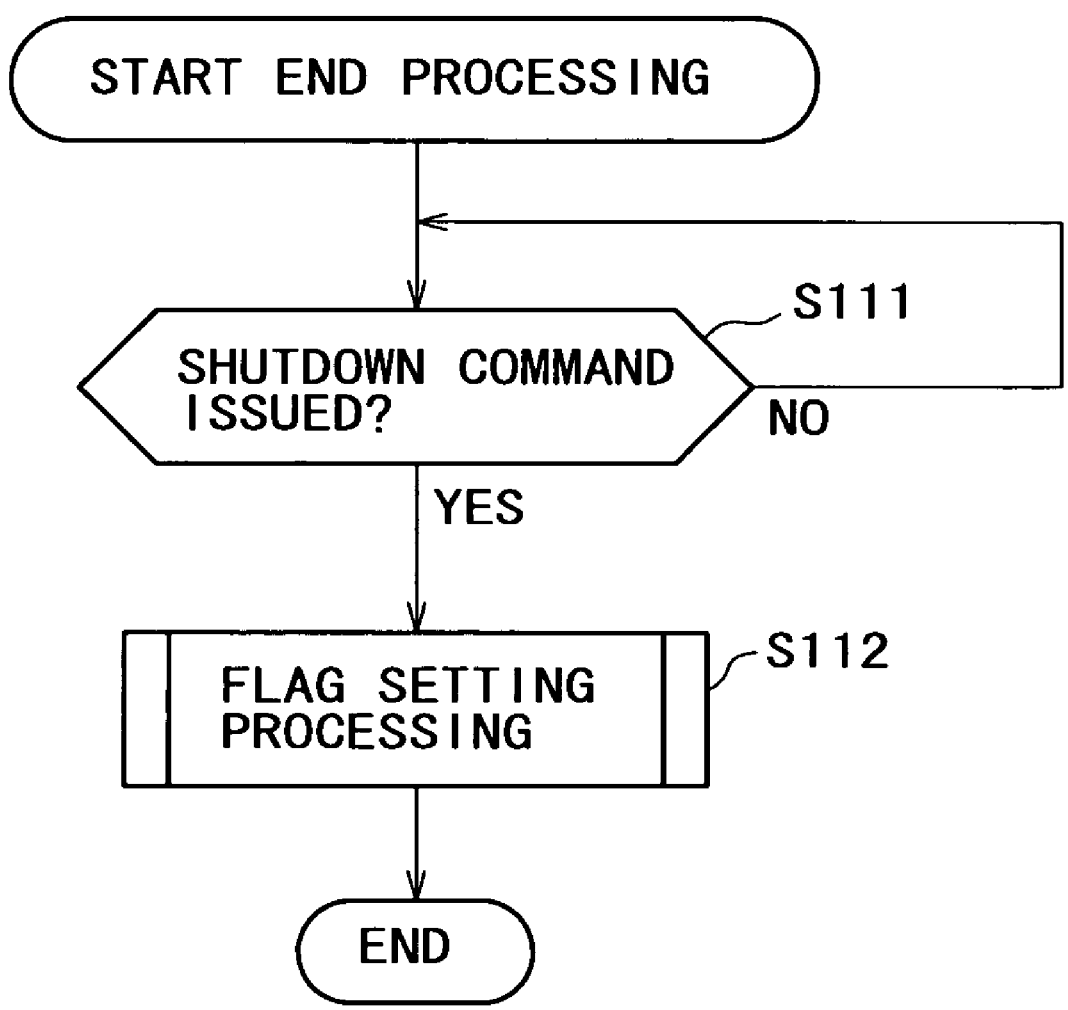
FIG. 10 is a flowchart for describing end processing.

The following describes the end processing of the information processing apparatus 1 with reference to FIG. 10. In step S111, the end processing section 62 of the CPU 22 determines whether the user has issued a command for shutting down the information processing apparatus 1. If the command is found not issued, the end processing section 62 waits until the command is issued. The shutdown command is issued by operating the keyboard of the input unit 26 of the information processing apparatus 1 for example.

If the shutdown command is found issued in step S111, then the end processing section 62 goes to step S112 to execute the flag setting processing which will be described later with reference to FIG. 11. Consequently, a flag indicative of the normal end of the information processing apparatus 1 is set.

Figure 11:
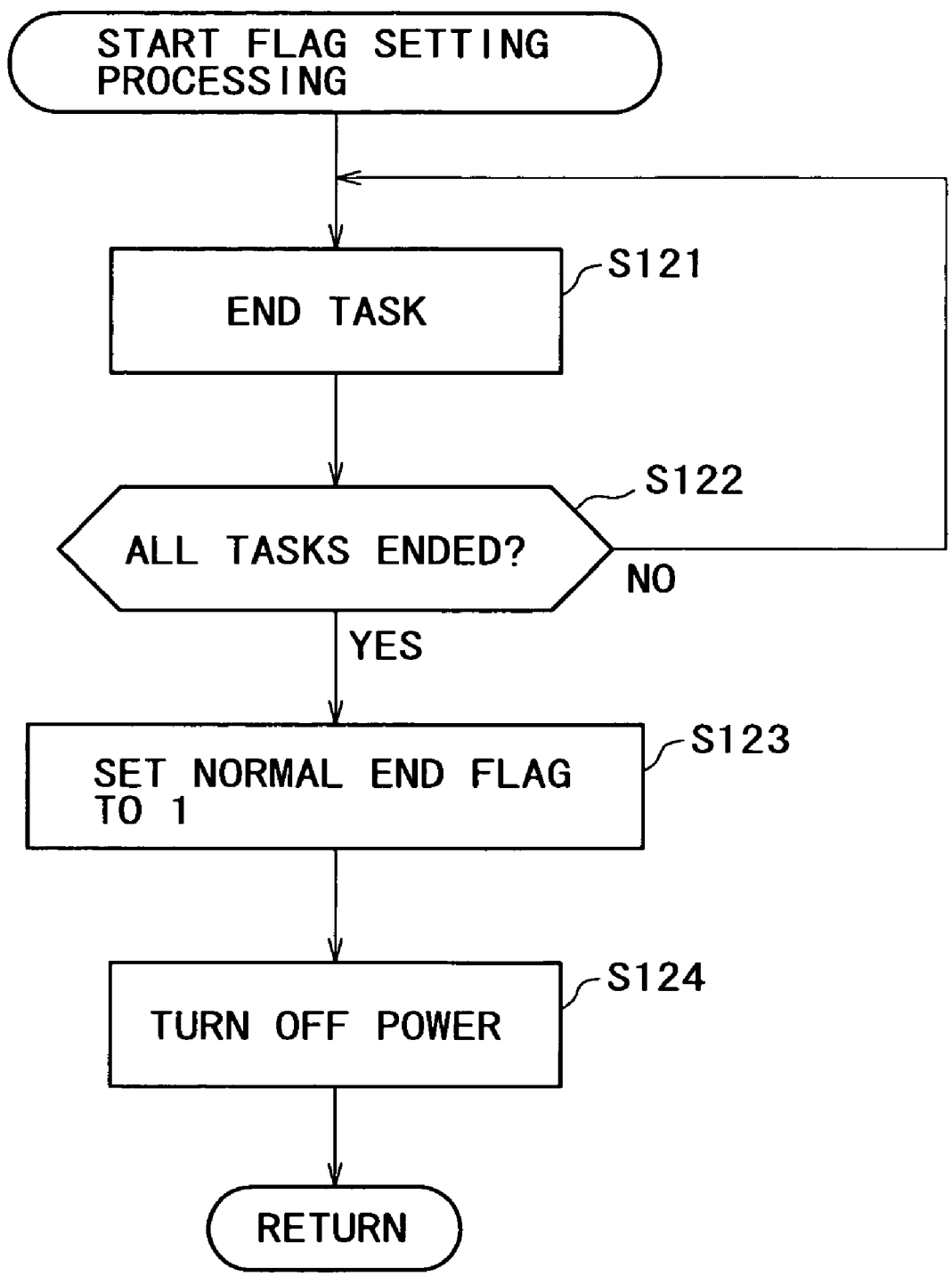
FIG. 11 is a flowchart for describing flag setting processing.

The following describes the flag setting processing of step S112 shown in FIG. 10 with reference to FIG. 11. In step S121, the end processing section 62 causes the processing section 43 to end the task being executed. In step S122, the end processing section 62 determines whether all tasks have ended. If the decision is no, the end processing section 62 returns to step S121 to end a next task. If the decision is yes in step S122, then the end processing section 62 goes to step S123 to set the normal end flag (the initial value=0) stored in a predetermined area in the memory 21 to 1. Consequently, the information indicative of the normal end of the information processing apparatus 1 is stored in the memory 21. In other words, if the normal end flag stored in the memory 21 is not 1 (namely, if the normal end flag is 0), then it indicates that the information processing apparatus 1 has abnormally ended due to power failure for example.

In step S124, the end processing section 62 powers off the information processing apparatus 1.

Thus, the value of the normal end flag is set.

Figure 12:
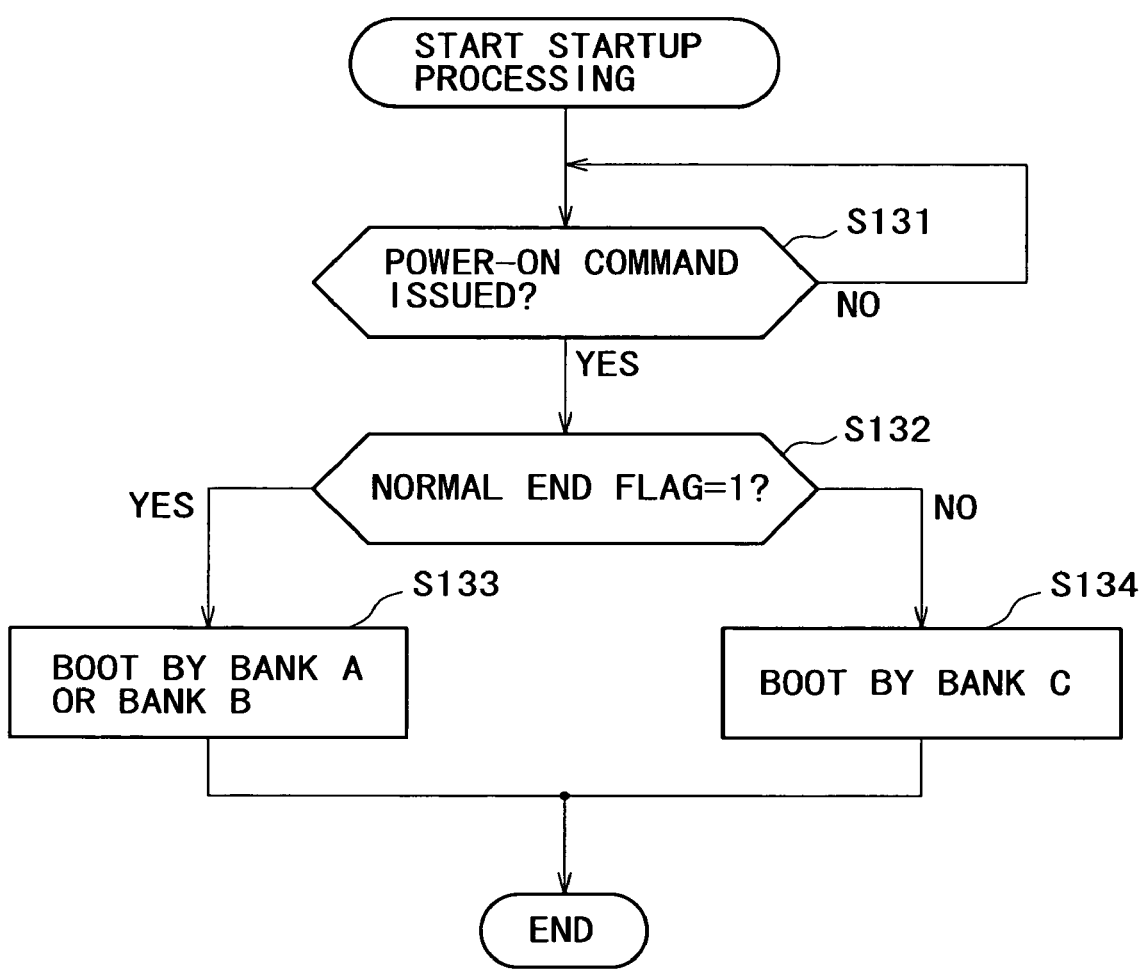
FIG. 12 is a flowchart for describing startup processing.

The following describes startup processing with reference to FIG. 12.

In step S131, the startup processing section 42 determines whether a power-on command has been issued. If the decision is no, the startup processing section 42 waits until the power-on command is issued. The power-on command is issued by pressing the power-on switch (not shown) of the information processing apparatus 1 for example.

If the power-on command is found issued in step S131, the startup processing section 42 goes to step S132 to determine whether the value of the normal end flag stored in the memory 21 is equal to 1. If the value of the normal end flag is found not to be equal 1 in step S132, it indicates that the information processing apparatus 1 has abnormally ended as described above, so that the files downloaded by the download processing described with reference to FIG. 4 may not be normally read from bank A or bank B. However, as described above, the files downloaded to the information processing apparatus 1 are copied to bank C by the file list creation processing (FIG. 6), so that the startup processing section 42 boots the information processing apparatus 1 by use of bank C in step S134.

On the other hand, if the value of the normal end flag is found to be equal to 1, then the startup processing section 42 goes to step S133 to boot the information processing apparatus 1 by use of bank A or bank B.

Thus, every time the information processing apparatus 1 is started up, the last end status (normal end or abnormal end) is determined and the bank for use in booting the information processing apparatus 1 is selected accordingly.

The above-mentioned sequences of processing can be executed either by hardware or software.

To execute the above-mentioned sequences of processing by software, the programs constituting the software are installed from recording media loaded on the drive 27 shown in FIG. 1 for example into a computer built in dedicated hardware or a general-purpose computer such as a personal computer which can execute various functions by installing various programs.

It should be noted that the steps for executing the above-mentioned sequences of processing may include not only the processing operations which are sequentially executed in the order described above but also the processing operations which are executed in parallel or discretely.

While the preferred embodiments of the present invention have been described using specific terms, such description is for illustrative purposes only, and it is to be understood that changes and variations may be made without departing from the spirit or scope of the appended claims.

What is claimed is:
1. An information processing apparatus comprising:
a storage area;
download processing means for downloading a predetermined number of software files into said storage area, a checksum for each file for error detection and a checksum total for all of said files;

first calculating means for calculating a first calculation value indicative of the checksum for each of said downloaded files;

second calculating means for calculating a second calculation value indicative of the sum of said first calculation values when all said files are downloaded; and determining means for determining whether said information processing apparatus has downloaded said software files with or without error by comparing said second calculation value with said downloaded checksum total.

2. The information processing apparatus according to claim 1, further comprising:

a second storage area; and selecting means for selecting one of said storage areas into which said software is to be downloaded.

3. The information processing apparatus according to claim 2, further comprising:

a third storage area, wherein said first calculating means copies the downloaded software into said third storage area.

4. The information processing apparatus according to claim 2 wherein said determining means comprises:

verifying means responsive to a shutdown command for verifying whether shutdown of said information processing apparatus has ended; and setting means for setting predetermined information indicative of normal end of the shutdown of said information processing apparatus.

5. The information processing apparatus according to claim 4, further comprising:

startup means for starting up said information processing apparatus by selecting one of said storage areas on the basis of said predetermined information set by said setting means.

6. The information processing apparatus according to claim 5, wherein said startup means has setting information determining means for determining the information set by said setting means which, starts up said information processing apparatus by use of the software stored in one of said first storage area and said second storage area, if the predetermined information indicative of normal end of the shutdown of said information processing apparatus is found set by said setting information determining means, and starts up said information processing apparatus by use of downloaded software copied to a third storage area, if the predetermined information indicative of normal end of the shutdown of said information processing apparatus is found not set by said setting information determining means.

7. The information processing apparatus according to claim 1, wherein said download processing means gets a checksum for each of said files, and said determining means compares said first calculation value with said last-mentioned checksum, if, as a result of the comparison by said determining means, there is a mismatch between said second calculation value and said checksum total.

8. The information processing apparatus according to claim 7, wherein, if there is a mismatch between said first calculation value and said last-mentioned checksum, said download processing means downloads a file corresponding to said first calculation value.

9. An information processing method for an information processing apparatus, comprising the steps of:

downloading a predetermined number of software files into a storage area, a checksum for each file for error detection and a checksum total for all of said files;

calculating a first calculation value indicative of the checksum for each of said downloaded files;

calculating a second calculation value indicative of the sum of said first calculation values when all said files are downloaded; and determining whether said information processing apparatus has downloaded said software files with or without error by comparing said second calculation value with said downloaded checksum total.

10. A program stored on a computer readable medium, said program causing a computer to execute the steps of:

downloading a predetermined number of software files into a storage area, a checksum for each file for error detection and a checksum total for all of said files;

calculating a first calculation value indicative of the checksum for each of said downloaded files;

calculating a second calculation value indicative of the sum of said first calculation values when all said files are downloaded; and determining whether said information processing apparatus has downloaded said software files with or without error by comparing said second calculation value with said downloaded checksum total.

11. A computer readable recording medium storing a program, said program causing a computer to execute the steps of:

downloading of a predetermined number of software files into a storage area, a checksum for each file for error detection and checksum total for all of said files;

calculating a first calculation value indicative of the checksum for each of said downloaded files;

calculating a second calculation value indicative of the sum of said first calculation values when all said files are downloaded; and determining whether said information processing apparatus has downloaded said software files with or without error by comparing said second calculation value with said downloaded checksum total.

* * * * *